United States Patent Office 3,644,456
Patented Feb. 22, 1972

1

3,644,456
DI[(ISOCYANATOBENZYL)-PHENYL] CARBODI-
IMIDES AND PREPARATION OF ORGANIC
CARBODIIMIDES
Henri Ulrich, Northford, Conn., assignor to The Upjohn
Company, Kalamazoo, Mich.
No Drawing. Original application Aug. 12, 1964, Ser. No.
389,193, now Patent No. 3,522,303, dated July 28,
1970. Divided and this application Mar. 20, 1970, Ser.
No. 21,477
Int. Cl. C07c *119/04;* C07f *9/22*
U.S. Cl. 260—453 AR        10 Claims

---

ABSTRACT OF THE DISCLOSURE

Organic isocyanates (mono- and poly-isocyanates) are converted to the corresponding carbodiimides using as catalyst a heterocyclic phosphorus compound of the formula:

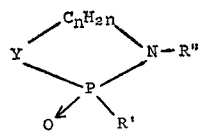

wherein $C_nH_{2n}$ is alkylene having 1 to 12 carbon atoms from 1 to 3 of which form a chain separating Y from N, R' is hydrocarbyl (1 to 18 carbon atoms) which can be substituted by halo, nitro, alkoxy, alkylmercapto and cyano, R" is hydrogen, hydrocarbyl (1 to 18 carbon atoms) or —CONHR''' where R''' is hydrocarbyl (1 to 18 carbon atoms) and Y is O or —NR" where R" is as above.

---

CROSS-REFERENCES TO RELATED
APPLICATIONS

This application is a division of application Ser. No. 389,193, filed Aug. 12, 1964, now U.S. Pat. No. 3,522,303.

This invention relates to novel heterocyclic phosphorus containing compounds and is more particularly concerned with novel 2-substituted-1,3,2-diazaphospholane 2-oxides, 2-substituted-1,3,2-oxazaphospholane 2 - oxides, 2-substituted-1,3,2-diazaphosphorinane 2 - oxides, 2-substituted-1,3,2-oxazaphosphorinane 2-oxides, and with derivatives thereof, and with methods for their preparation, and with the use of such compounds in the conversion of organic isocyanates to the corresponding carbodiimides.

2

The novel compounds of the invention can be represented for the most part by the following general formula:

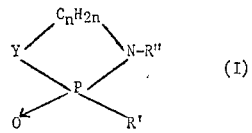  (I)

wherein $C_nH_{2n}$ represents an alkylene radical containing from 1 to 12 carbon atoms, inclusive, at least one and not more than 3 adjacent carbon atoms in said alkylene radical forming a chain one end of which is attached to Y and the other end of which is attached to N thereby completing the heterocyclic ring; R' is selected from the class consisting of hydrocarbyl containing from 1 to 18 carbon atoms, inclusive, and halo-, nitro-, alkoxy-, alkylmercapto-, and cyano-substituted hydrocarbyl containing from 1 to 18 carbon atoms, inclusive; R" is selected from the class consisting of hydrogen, hydrocarbyl from 1 to 18 carbon atoms, inclusive, and the radical —CONHR''' wherein R''' represents hydrocarbyl containing from 1 to 18 carbon atoms, inclusive; and Y is selected from the class consisting of —O— and —NR"— wherein R" has the significance defined above.

The term "alkylene radical containing from 1 to 12 carbon atoms, inclusive at least one and not more than 3 adjacent carbon atoms in said alkylene radical forming a chain one end of which is attached to Y and the other end of which is attached to N" means methylene, ethylene, and trimethylene, one or more of the hydrogen atoms of which divalent radicals can be replaced by alkyl groups such as methyl, ethyl, propyl, butyl, pentyl, hexyl, and isomeric forms thereof, provided that the total number of carbon atoms in the resulting alkylene radical does not exceed the stated limit. Examples of alkylene radicals falling within the definition are methylene, ethylidene, propylidene, isopropylidene, ethylene, 1,2-propylene, 1,2-butylene, 1,3-butylene, 2-ethyl-1,3-butylene, 2,4-hexylene, 1,3-octylene, 4,5-decylene, 5,6-dodecylene, and the like.

The term "hydrocarbyl containing from 1 to 18 carbon atoms, inclusive," means the monovalent radical obtained by removing one hydrogen atom from the parent hydrocarbon having the stated carbon atom content. Illustrative of such groups are alkyl groups such as methyl, ethyl, propyl, butyl, pentyl, hexyl, octyl, decyl, dodecyl, hexadecyl, octadecyl, and the like, including isomeric forms thereof; alkenyl groups such as vinyl, allyl, butenyl, pentenyl, hexenyl, octenyl, and the like, including isomeric forms thereof; aralkyl such as benzyl, phenethyl, phenylpropyl, benzhydryl, naphthylmethyl, and the like; aryl such as phenyl, tolyl, xylyl, naphthyl, biphenylyl, and the like; cycloalkyl such as cyclobutyl, cyclopentyl, cyclohexyl, cycloheptyl, cyclooctyl and the like, including isomeric forms thereof; cycloalkenyl such as cyclopentenyl, cyclohexenyl, cycloheptenyl, and the like, including isomeric forms thereof.

The term "halo-, nitro-, alkoxy-, alkylmercapto-, and cyano- substiuted hydrocarbyl containing from 1 to 18 carbon atoms" means a hydrocarbyl radical of the stated carbon atom content as above exemplified, which hydrocarbyl radical is substituted by one or more halo, nitro, alkoxy, alkylmercapto or cyano groups. Illustrative of such substituted hydrocarbyl groups are chloromethyl,
trichloromethyl,
trifluoromethyl,
2-chloroethyl,
2,3-dichlorobutyl,
5-bromooctyl,
6,7-dibromodecyl,
methoxymethyl,
2-ethoxypropyl,
3-ethoxyhexyl,
2-cyanoethyl,
3-cyanopropyl,
2-methylmercaptopropyl,
4-chlorophenyl,
3-fluorophenyl,
4-cyanophenyl,
3-methoxyphenyl,
4-ethoxyphenyl,
2-chloronaphthyl,
2-methylmercaptophenyl,
3,4-dimethoxyphenyl,
3-chlorobenzyl,
4-fluorobenzyl,
2-methoxycyclopentyl,
3-bromocyclohexyl,
4-chlorocyclohexenyl,
2-chloropropenyl,
4-bromobutenyl,
2-chlorovinyl,
nitromethyl,
3-nitrobutyl,
4-nitrophenyl,
2-nitronaphthyl,
3-methyl-4-nitrophenyl,
3-nitrocyclopentyl,
2-nitro-1-butenyl,
4-methylmercaptobenzyl,
2-chlorobenzhydryl,
2,4-dibromobenzydryl and the like.

The term "alkoxy" as used throughout the specification and claims means alkoxy containing from 1 to 8 carbon atoms, inclusive, such as methoxy, ethoxy, propoxy, butoxy, pentyloxy, hexyloxy, heptyloxy, octyloxy, and isomeric forms thereof. The term "alkylmercapto" as used throughout the specification and claims means alkylmercapto containing from 1 to 8 carbon atoms such as methylmercapto, ethylmercapto, propylmercapto, butylmercapto, pentylmercapto, hexylmercapto, octylmercapto, and isomeric forms thereof.

The compounds of the invention having the Formula I are novel compounds having a variety of uses. Illustratively the novel compounds having the Formula I are useful as fire retardants; for example, they can be added in a concentration of about 1% by weight or higher to foam mixes in the production of polyurethane foams as described by Dombrow, "Polyurethanes," Reinhold Publishing Corporation, New York, pp. 1–105 (1957), to yield polyurethanes having fire retardant properties. In particular the compounds of Formula I wherein R″ is hydrogen and Y represents —NH—, can by virtue of the two reactive hydrogen atoms therein, be incorporated into polyurethanes by adding them to the reaction mixture of polyisocyanate and polyol from which the polyurethane is prepared according to the procedures described above. The polyurethanes so obtained possess enhanced fire retardant properties. The compounds of the invention having the Formula I are also useful as catalysts in the preparation of carbodiimides from isocyanates. This latter use of the compounds of the invention will be discussed in more detail hereinafter.

The novel compounds having the Formula I above are also useful as stabilisers of polymeric materials, such as polyvinyl chloride and copolymers thereof against the deleterious effects produced thereto by exposure to ultraviolet radiation. For these purposes, the compounds of Formula I are blended in the mixture containing the polyvinyl compound, plasticiser and other conventional adjuvants used in the preparation of the composition to be stabilised. Advantageously the compound of Formula I is employed in the proportion of about 1 to about 10 parts by weight per 100 parts of the polyvinyl compound.

The novel compounds of the invention can be produced by the reaction which is represented schematically by the following equation:

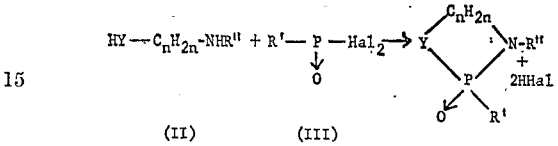

In the above equation $C_nH_{2n}$, R′, and R″ have the significance above defined and Hal represents halogen preferably chlorine.

In carrying out the preparation of the compounds (I) in accordance with the reaction set forth in the above equation, the amine (II) and the hydrocarbyl phosphonic dihalide (III) are brought together in the presence of a tertiary amine, as acid acceptor, and an inert solvent. Illustrative of tertiary amines which can be used as acid acceptors in the above process are pyridine, trialkylamines such as triethylamine, trimetylamine, triisopropylamine, tributylamine and the like, N-alkylpiperidines such as N-methylpiperidine, N - ethylpiperidine, N - isopropylpiperidine, and the like, N-alkylmorpholines such as N-methylmorpholine, N-ethylmorpholine and the like, and N-dialkylanilines such as N,N-dimethylaniline, N,N-diethylaniline, N,N-dibutylaniline, and the like. Illustrative of inert organic solvents, i.e. organic solvents which are inert under the conditions of the reaction, are hydrocarbons, particularly aromatic hydrocarbons, such as benzene, toluene, xylene, naphthalene and the like, and halogenated hydrocarbons such as methylene dichloride, ethylene dichloride, ethylene dibromide, carbon tetrachloride, chloroform, bromoform, chlorobenzene, bromobenzene, o-dichlorobenzene, and the like.

Generally speaking the reaction of the amine (II) and the phosphonic dihalide (III) is exothermic and does not require the application of external heat to ensure completion. In certain cases, however, it is necessary to heat the reaction mixture after the reactants have been brought together. Normally, it is advantageous to mix the reactants by adding the phosphonic dihalide (III) to a mixture of the amine (II) and the tertiary amine acid acceptor. When this addition has been completed the reaction mixture can, if desired, be heated to temperatures up to the order of 100° C., or to the reflux temperature of the reaction mixture if the latter is less than 100° C., in order to complete the reaction.

Advantageously, the amine (II) and the phosphonic dihalide (III) are employed in approximately stoichiometric roportions in the above reaction though higher or lower proportions can be employed with consequent reduction in the yield of the desired compound (I). The proportion of trialkylamine employed in the process of the invention is advantageously of the order of 2 moles per mole of the phosphonic dihalide (III) though higher or lower proportions of tertiary amine can be employed if desired.

The hydrohalic acid liberated in the process of the invention forms the corresponding acid addition salt of the tertiary amine employed as acid acceptor and said salt normally separates as a precipitate from the reaction mixture. The precipitate is removed by filtration, centrifugation, and the like and the desired compound (I) is isolated from the filtrate by procedures known in the art, for example, by evaporation of the filtrate and purification of the residue by distillation, in the case of a liquid, or recrystallisation in the case of a solid.

In an alternative procedure for carrying out the reaction between the amine (II) and the phosphonic dihalide (III) the latter is added to a well-stirred mixture of the former in the presence of a water-immiscible inert organic solvent and an aqueous solution of an inorganic base such as sodium carbonate, potassium carbonate, potassium hydroxide, sodium hydroxide, lithium hydroxide and the like. Advantageously the inorganic base is employed in the proportion of at least 2 equivalents per mole of phosphonic dihalide. When the reaction is complete the organic layer is separated and the desired compound (I) is isolated therefrom by procedures known in the art, for example, those described above in connection with the alternate procedures for the preparation of (I). The water-immiscible inert organic solvents employed in the above procedure are advantageously hydrocarbons and halogenated hydrocarbons as exemplified hereinbefore.

The amines (II) which are employed as starting materials in the preparation of the compounds (I) are, for the most part, known in the art or can be prepared by known methods. Thus the compounds (II) wherein Y represents —NR″— and R″ in both instances is hydrogen or alkyl, are alkylene diamines which can be prepared by conventional procedures known in the art for the preparation of alkylene diamines; see, for example, Chemistry of Carbon Compounds, edited by E. H. Rodd, Elsevier Publishing Company, New York, 1951, vol. I-A, pages 697–701. The amines (II) wherein Y represents —O— are alkanolamines which can be prepared by conventional procedures known in the art; see, for example, E. H. Rodd, ibid, vol. I-A, pages 689–691.

The amines (II) wherein R″ represents —CONHR‴ and R‴ is as hereinbefore defined, including those wherein Y represents —O— or —NR″—, can be prepared by reaction of the corresponding unsubstituted amine i.e. R″=H, with the appropriate isocyanate R‴NCO under conditions well-known in the art for the preparation of substituted ureas from amines and isocyanates see, for example, Bickel and French J. Am. Chem. Soc. 48,747,1926.

The hydrocarbyl phosphonic dihalides of the Formula III which are employed as starting materials in the preparation of the compounds (I) are also, for the most part, known in the art and can be prepared by conventional procedures, for example, that described in British Pat. 707,961 which describes the preparation of hydrocarbyl phosphonic dihalides by reaction of the appropriate halohydrocarbon with phosphorus trihalide in the presence of aluminum chloride, or that described in British Pat. 648,328 which describes the air or oxygen blowing of a mixture of the appropriate hydrocarbon and phosphorus trihalide. Representative of known hydrocarbyl phosphonic dihalides having the Formula III are: methyl-, tertbutyl-, hexadecyl-, benzyl-, allyl-, chloromethyl-, trichloromethyl-, 2-chloroethyl-, 2-bromoethyl-, butoxybutyl-, 2-(butylthiovinyl)-, 1-chlorobutyl, (2-chloro-1-hexenyl), 1-(chloromethyl)-butyl-, 4-chloro-3-nitrophenyl-, p-chlorophenyl-, 2-chlorovinyl-, cyclohexyl-, 2-ethoxyethyl-, 2-methylpropenyl-, 2-naphthyl-, 2,2,2-trichloroethyl-, octadecyl-, phenyl-, 2-phenylbenzyl-, p-ethylphenyl-, 1,1,2,2-tetrafluoroethyl-, 4-trifluoromethylphenyl-, 4-trichloromethylphenyl-, dodecyl-, p-butoxyphenyl-, 2-chlorocyclohexyl-, 2,4-dimethoxyphenyl-, 2,5-dibromophenyl-, m-tolyl-, 3,4-xylyl-, dichloro-1,3-butadienyl-, p-bromobenzyl-, cyclopentyl-, and phenyl-octadecyl-phosphonic dichlorides.

The system of nomenclature used throughout the specification and claims is illustrated by the following examples:

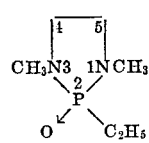

2-ethyl-1,3-dimethyl-1,3,2-diazaphospholane 2-oxide

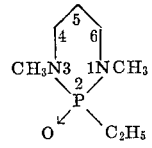

2-ethyl-1,3-dimethyl-1,3,2-diazaphosphorinane 2-oxide

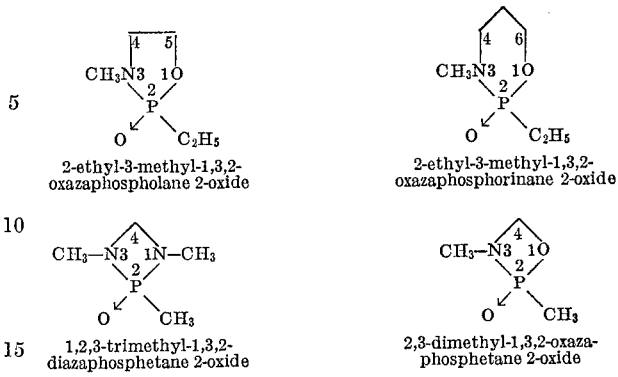

2-ethyl-3-methyl-1,3,2-oxazaphospholane 2-oxide 2-ethyl-3-methyl-1,3,2-oxazaphosphorinane 2-oxide 1,2,3-trimethyl-1,3,2-diazaphosphetane 2-oxide 2,3-dimethyl-1,3,2-oxazaphosphetane 2-oxide The following examples describe the manner and process of making and using the invention and set forth the best mode contemplated by the inventors of carrying out the invention but are not to be construed as limiting.

EXAMPLE 1

*2-ethyl-1,3-dimethyl-1,3,2-diazaphospholane 2-oxide*

To a mixture of 6 grams (0.07 mole) of N,N′-dimethylethylenediamine and 14.14 grams (0.14 mole) of triethylamine in 190 ml. of benzene was added 11 grams (0.07 mole) of ethylphosphonic dichloride dropwise with stirring over a period of 6 minutes. The temperature rose from 28 to 38° C. After stirring for 20 minutes a precipitate of 18 grams (94%) of triethylamine hydrochloride was removed by filtration. Evaporation of the filtrate and distillation of the residue under reduced pressure gave 7.8 g. (68.5% of theory) of 2-ethyl-1,3-dimethyl-1,3,2-diazaphospholane 2-oxide in the form of a liquid having a boiling point of 93° C./0.5 mm.

*Analysis.*—Calcd. for $C_6H_{15}N_2OP$ (percent): C, 44.42; H, 9.32; N, 17.20; P, 19.10. Found (percent): C, 44.27; H, 8.74; N, 17.09; P, 19.24.

EXAMPLE 2

*2-chloromethyl-1,3-dimethyl-1,3,2-diazaphospholane-2-oxide*

To a mixture of 8.8 grams (0.1 mole) of N,N′-dimethylethylenediamine and 20.2 g. (0.2 mole) of triethylamine in 275 ml. of benzene was added 16.7 g. (0.1 mole) of chloromethylphosphonic dichloride dropwise over a period of 12 minutes at 28 to 63° C. After stirring the resulting mixture for 30 minutes a precipitate of 26.4 g. (94.5%) of triethylamine hydrochloride was removed by filtration. Evaporation of the filtrate gave 18.4 g. of crude reaction product which was recrystallised from ligroin to obtain 2-chloromethyl-1,3-dimethyl-1,3,2-diazaphospholane-2-oxide as white crystals, melting at 75 to 77° C.

*Analysis.*—Calcd. for $C_5H_{12}ClN_2OP$ (percent): N, 15.34; P, 16.97. Found (percent): N, 15.37; P, 16.54.

EXAMPLE 3

*2-trichloromethyl-1,3-dimethyl-1,3,2-diazaphospholane 2-oxide*

To a mixture of 8.6 g. (0.1 mole) of N,N′-dimethylethylenediamine and 20.2 g. (0.2 mole) of triethylamine in 250 ml. of benzene was added a solution of 23.6 g. (0.1 mole) of trichloromethylphosphonic dichloride in 100 ml. of benzene over a period of 22 minutes at 27 to 54° C. The resulting mixture was heated at reflux (80 to 82° C.) for 30 minutes and cooled to room temperature. The precipitate of 20.2 g. (73%) of triethylamine hydrochloride was removed by filtration and the filtrate was evaporated to yield a crude crystalline residue. The latter was recrystallised from ligroin to yield 2-trichloromethyl-1,3-dimethyl-1,3,2-diazaphospholane 2-oxide as white crystals having a melting point of 88° C.

*Analysis.*—Calcd. for $C_5H_{10}Cl_3N_2OP$ (percent): N, 11.13; P, 12.31. Found (percent): N, 11.19; P, 12.30.

EXAMPLE 4

*2-phenyl-1,3-dimethyl-1,3,2-diazaphospholane 2-oxide*

A mixture of 17.6 g. (0.2 mole) of N,N'-dimethylethylene diamine and 40.4 g. (0.4 mole) of triethylamine in 410 ml. of benzene was added dropwise, with stirring, to 39 g. (0.2 mole) of phenylphosphonic dichloride over a period of 30 minutes at 27 to 59° C. After cooling the resulting mixture to room temperature a precipitate of 53.9 g. (96%) of triethylamine hydrochloride was removed by filtration. The filtrate was evaporated to yield 45.3 g. of crude reaction product. A 22 gram sample of the crude reaction product was distilled in vacuum to obtain 14.15 g. (70%) of 2-phenyl-1,3-dimethyl-1,3,2-diazaphospholane 2-oxide in the form of a solid having a boiling point at 130° C./0.7 mm. and a melting point of 30 to 38° C.

*Analysis.*—Calcd. for $C_{10}H_{15}N_2OP$ (percent): C, 57.13; H, 7.18; N, 13.32; P, 14.73. Found (percent): C, 57.14; H, 7.03; N, 13.13; P, 14.74.

EXAMPLE 5

*2-phenyl-1,3-dimethyl-1,3,2-diazaphorinane 2-oxide*

To a mixture of 5.0 g. (0.054 mole) of N,N'-dimethylpropanediamine-1,3 and 10.9 g. (0.108 mole) of triethylamine in 150 ml. of benzene was added dropwise, with stirring, 10.5 g. (0.054 mole) of phenylphosphonic dichloride over a period of 8 minutes at 24 to 51° C. After cooling the resulting mixture to room temperature the precipitate of 12.7 g. (86%) of triethylamine hydrochloride was removed by filtration. Evaporation of the filtrate afforded 13.4 g. of a crude residue. Vacuum distillation of the residue gave 8.0 g. (71.5%) of 2-phenyl-1,3-dimethyl-1,3,2-diazaphorinane-2-oxide in the form of a liquid having a boiling point at 140 to 143° C./0.3 mm.

EXAMPLE 6

*2-benzyl-1,3-dimethyl-1,3,2-diazaphospholane 2-oxide*

Using the procedure described in Example 1, but replacing ethylphosphonic dichloride by benzylphosphonic dichloride, there is obtained 2-benzyl-1,3-dimethyl-1,3,2-diazaphospholane 2-oxide.

EXAMPLE 7

*2-allyl-1,3-dimethyl-1,3,2-diazaphospholane 2-oxide*

Using the procedure described in Example 1, but replacing ethylphosphonic dichloride by allylphosphonic dichloride, there is obtained 2-allyl-1,3-dimethyl-1,3,2-diazaphospholane 2-oxide.

EXAMPLE 8

*2-bromomethyl-1,3-dimethyl-1,3,2-diazaphospholane 2-oxide*

Using the procedure described in Example 1, but replacing ethylphosphonic dichloride by bromomethylphosphonic dichloride, there is obtained 2-bromomethyl-1,3-dimethyl-1,3,2-diazaphospholane 2-oxide.

EXAMPLE 9

*2-cyclohexyl-1,3-dimethyl-1,3,2-diazaphospholane 2-oxide*

Using the procedure described in Example 1, but replacing ethylphosphonic dichloride by cyclohexylphosphonic dichloride, there is obtained 2-cyclohexyl-1,3-dimethyl-1,3,2-diazaphospholane 2-oxide.

EXAMPLE 10

*2-(2-ethoxyethyl)-1,3-dimethyl-1,3,2-diazaphospholane 2-oxide*

Using the procedure described in Example 1, but replacing ethylphosphonic dichloride by 2-ethoxyethylphosphonic dichloride, there is obtained 2-(2-ethoxyethyl)-1,3-dimethyl-1,3,2-diazaphospholane 2-oxide.

EXAMPLE 11

*2-octadecyl-1,3-dimethyl-1,3,2-diazaphospholane 2-oxide*

Using the procedure described in Example 1, but replacing ethylphosphonic dichloride by octadecylphosphonic dichloride, there is obtained 2-octadecyl-1,3-dimethyl-1,3,2-diazaphospholane 2-oxide.

EXAMPLE 12

*2-naphthyl-1,3-dimethyl-1,3,2-diazaphospholane 2-oxide*

Using the procedure described in Example 1, but replacing the ethylphosphonic dichloride by 2-naphthylphosphonic dichloride, there is obtained 2-naphthyl-1,3-dimethyl-1,3,2-diazaphospholane 2-oxide.

Similarly, using the procedure of Example 1, but replacing ethylphosphonic dichloride by the following phosphonic dihalides:

tert-butyl-,
2-chloroethyl-,
4-butoxybutyl-,
2-(butylthio)vinyl-,
2-chloro-1-hexenyl-,
4-chloro-3-nitrophenyl-,
4-chlorophenyl-,
2-chlorovinyl-,
2,2,2-trichloroethyl-,
o-phenylbenzyl-,
4-ethylphenyl-,
1,1,2,2-tetrafluoroethyl-,
4-trichloromethylphenyl-,
4-trifluoromethylphenyl-,
dodecyl-,
4-butoxyphenyl-,
2-chlorocyclohexyl-,
2,4-dimethoxyphenyl-,
2,5-dibromophenyl-,
m-tolyl-,
3,4-xylyl-,
4-bromobenzyl-, and
cyclopentylphosphonic dichloride, there are obtained:

2-tert-butyl-,
2-(2-chloroethyl)-,
2-(4-butoxybutyl)-,
2-(2-butylthiovinyl)-,
2-(2-chloro-1-hexenyl)-,
2-(4-chloro-3-nitrophenyl)-,
2-(4-chlorophenyl)-,
2-(2-chlorovinyl)-,
2-(2,2,2-trichloroethyl)-,
2-(o-phenylbenzyl)-,
2-(4-ethylphenyl)-,
2-(1,1,2,2-tetrafluoroethyl)-,
2-(4-trichloromethylphenyl)-,
2-(4-trifluoromethylphenyl)-,
2-dodecyl-,
2-(4-butoxyphenyl)-,
2-(2-chlorocyclohexyl)-,
2-(2,4-dimethoxyphenyl)-
2-(2,5-dibromophenyl)-,
2-(m-tolyl)-,
2-(3,4-xylyl)-,
2-(4-bromobenzyl)- and
2-cyclopentyl-1,3-dimethyl 1,3,2-diazaphospholane 2-oxide, respectively.

EXAMPLE 13

*2-ethyl-1-benzyl-1,3,2-diazaphospholane 2-oxide*

Using the procedure described in Example 1, but replacing N,N'-dimethylethylenediamine by N-benzylethylenediamine, there is obtained 2-ethyl - 1 - benzyl-1,3,2-diazaphospholane 2-oxide.

EXAMPLE 14

*2-ethyl-1-benzyl-3-phenyl-1,3,2-diazaphospholane 2-oxide*

Using the procedure described in Example 1, but replacing N,N'-dimethylethylenediamine by N-benzyl-N'-phenylethylenediamine, there is obtained 2-ethyl-1-benzyl-3-phenyl-1,3,2-diazaphospholane 2-oxide.

EXAMPLE 15

*2-ethyl-1-cyclohexyl-1,3,2-diazaphospholane 2-oxide*

Using the procedure described in Example 1, but replacing N,N'-dimethylethylenediamine by N-cyclohexylethylenediamine, there is obtained 2-ethyl-1-cyclohexyl-1,3,2-diazaphospholane 2-oxide.

EXAMPLE 16

*2-ethyl-1,3-diallyl-1,3,2-diazaphospholane 2-oxide*

Using the procedure described in Example 1, but replacing N,N'-dimethylethylenediamine by N,N'-diallylethylenediamine, there is obtained 2-ethyl-1,3-diallyl-1,3,2-diazaphospholane 2-oxide.

Similarly, using the procedure described in Example 1, but replacing N,N'-dimethylethylenediamine by the following:

N-benzyl-N'-diphenylmethyl-,
N-benzyl-N'-α-ethylbenzyl-,
N-4-biphenylyl-,
N,N'-bis(1,3-dimethylbutyl)-,
N,N'-bis(2-ethylcyclohexyl)-,
N,N'-bis(2-ethylhexyl)-,
N-2-cyclopenten-1-yl-,
N,N'-dibutyl-,
N,N'-dicyclohexyl-,
N,N'-didodecyl-,
N,N'-diphenethyl-,
N-1-naphthyl-, and
N-o-tolylethylenediamine there are obtained:
2-ethyl-1-benzyl-3-diphenylmethyl-,
2-ethyl-1-benzyl-3-α-ethylbenzyl-,
2-ethyl-1-(4-biphenylyl)-,
2-ethyl-1,3-bis(1,3-dimethylbutyl)-,
2-ethyl-1,3-bis(2-ethylcyclohexyl)-,
2-ethyl-1,3-bis(2-ethylhexyl)-,
2-ethyl-1-(2-cyclopenten-1-yl)-,
2-ethyl-1,3-dibutyl-,
2-ethyl-1,3-dicyclohexyl-,
2-ethyl-1,3-didodecyl-,
2-ethyl-1,3-diphenethyl-,
2-ethyl-1-(1-naphthyl)-, and
2-ethyl-1-(o-tolyl)-1,3,2-diazephospholane 2-oxide.

EXAMPLE 17

*2,4-diethyl-1-butyl-1,3,2-diazaphospholane 2-oxide*

Using the procedures described in Example 1, but replacing N,N' - dimethylethylenediamine by N-butyl-1,2-butanediamine, there is obtained 2,4-diethyl-1-butyl-1,3,2-diazaphospholane 2-oxide.

EXAMPLE 18

*4-methyl-1,2,3-triethyl-1,3,2-diazaphosphorinane 2-oxide*

Using the procedure described in Example 1, but replacing N,N'-dimethylethylenediamine by N,N'-diethyl-1,3-butanediamine there is obtained 4-methyl-1,2,3-triethyl-1,3,2-diazaphosphorinane 2-oxide.

EXAMPLE 19

*2-ethyl-1-benzyl-1-phenyl-1,3,2-diazaphosphetane-2-oxide*

Using the procedure described in Example 1, but replacing N,N'-dimethylethylenediamine by N-benzyl-N'-phenylmethylene diamine, there is obtained 2 - ethyl - 1-benzyl-3-phenyl-1,3,2-diazaphosphetane 2-oxide.

Similarly, using the procedure described in Example 1, but replacing N,N'-dimethylethylenediamine by the following:

N¹-cyclohexyl-2-methyl-1,2-propanediamine,
N¹,N²-diphenyl-1,2-propanediamine,
N¹-octyl-1,2-propanediamine,
2-ethyl-1,3-hexanediamine, and
N-benzyl-1,3-propanediamine, there are obtained:

2-ethyl-1-cyclohexyl-4-dimethyl-1,3,2-diazaphospholane 2-oxide,
2-ethyl-1,3-diphenyl-4-methyl-1,3,2-diazaphospholane 2-oxide,
2-ethyl-4-methyl-1-octyl-1,3,2-diazaphospholane, 2-oxide,
2,5-diethyl-4-propyl-1,3,2-diazaphosphorinane 2-oxide, and
2-ethyl-1-benzyl-1,3,2-diazaphosphorinane 2-oxide, respectively.

EXAMPLE 20

*2-ethyl-3-benzyl-1,3,2-oxazaphosphorinane 2-oxide*

Using the procedure described in Example 1, but replacing N,N'-dimethylethylenediamine by 3-benzylamino-1-propanol, there is obtained 2 - ethyl - 3 - benzyl-1,3,2-oxazaphosphorinane 2-oxide.

EXAMPLE 21

*2,3-diethyl-1,2,3-oxazaphospholane 2-oxide*

Using the procedure described in Example 1, but replacing N,N'-dimethylethylenediamine by 2-ethylaminoethanol, there is obtained 2,3-diethyl-1,3,2-oxazaphospholane 2-oxide.

Similarly using the procedure described in Example 1, but replacing N,N'-dimethylethylenediamine by the following known compounds:

2-aminoethanol,
2-pentylaminoethanol,
2-benzylaminoethanol,
2-(4-biphenylylamino)ethanol,
2-sec-butylaminoethanol,
2-(cyclohexen-1-ylamino)ethanol,
2-cyclohexylaminoethanol,
2-dodecylaminoethanol,
2-hexylaminoethanol,
2-isobutylaminoethanol,
2-(1-naphthylmethylamino)ethanol and
2-phenethylaminoethanol, there are obtained:

2-ethyl-,
2-ethyl-3-pentyl-,
2-ethyl-3-benzyl-,
2-ethyl-3-(4-biphenylyl)-,
2-ethyl-3-sec-butyl-,
2-ethyl-3-(·1-cyclohexene1-yl)-,
2-ethyl-3-cyclohexyl-,
2-ethyl-3-dodecyl-,
2-ethyl-3-hexyl-,
2-ethyl-3-isobutyl-,
2-ethyl-3-(1-naphthylmethyl)-, and
2-ethyl-3-phenethyl-1,3,2-oxazaphospholane 2-oxide, respectively.

EXAMPLE 22

*2-ethyl-3-methyl-5-propyl-1,3,2-oxazaphospholane 2-oxide*

Using the procedure described in Example 1, but replacing N,N' - dimethylethylenediamine by 3 - (aminomethyl)-3-pentanol, there is obtained 2-ethyl-3-methyl-5-propyl-1,3,2-oxazaphospholane 2-oxide.

Similarly, using the procedure of Example 1, but replacing N,N'-dimethylethylenediamine by the following known compounds:

2-amino-1-octanol,
5-amino-4-octanol,
4-methylamino-2-pentanol,
2-isopropylamino-1-butanol, and
2-amino-3-methyl-1-butanol, there are obtained:

2-ethyl-4-hexyl-1,3,2-oxazaphospholane 2-oxide,
2-ethyl-4,5-dipropyl-1,3,2-oxazaphospholane 2-oxide,
2-ethyl-3,4,6-trimethyl-1,3,2-oxazaphosphorinane 2-oxide,
2,4-diethyl-3-isopropyl-1,3,2-oxazaphospholane 2-oxide, and
2-ethyl-3,4-diisopropyl-1,3,2-oxazaphospholane 2-oxide respectively.

EXAMPLE 23

*2-ethyl-3-phenylcarbamyl-1,3,2-oxazaphospholane 2-oxide*

Using the procedure described in Example 1, but replacing N,N'-dimethylethylenediamine by 1-(2-hydroxyethyl)-3-phenylurea, there is obtained 2-ethyl-3-phenylcarbamyl-1,3,2-oxazaphospholane 2-oxide.

Similarly, using the procedure described in Example 1, but replacing N,N'-dimethylethylenediamine by the known compounds 1-(3-hydroxybutyl)-3-phenylurea, 1-hydroxymethyl-3-phenylurea, or 1-hydroxymethyl-3-tolylurea, there are obtained 2 - ethyl - 3-phenylcarbamyl-6-methyl - 1,3,2 - oxazaphosphorinane 2-oxide, 2-ethyl-3-phenylcarbamyl-, and 2 - ethyl - 3-p-tolylcarbamyl-1,3,2-oxazaphosphetane 2-oxide, respectively.

EXAMPLE 24

*1,3-di(phenylcarbamyl)-2-ethyl-1,3,2-diazaphospholane 2-oxide*

Using the procedure described in Example 1, but replacing N,N'-dimethylethylenediamine by 1,1'-ethylenebis(3-phenylurea), there is obtained 1,3-di(phenylcarbamyl)-2-ethyl-1,3,2-diazaphospholane 2-oxide.

Similarly, using the procedure described in Example 1, but replacing N,N' - dimethylethylenediamine by 1,1'-ethylenebis(3 - ethylurea) and 1,1'-ethylenebis(3-benzylurea) there are obtained:

1,3-di(ethylcarbamyl)-2-ethyl, and
1,3-di(benzylcarbamyl)-2-ethyl-1,3,2-diazaphospholane 2-oxide, respectively.

EXAMPLE 25

*2-ethyl-1,3-dimethyl-1,3,2-diazaphosphorinane 2-oxide*

To a mixture of 5.2 g. (0.056 mole) of N,N'-dimethylpropane-1,3-diamine and 11.3 g. (0.112 mole) of triethylamine in 160 ml. of benzene was added dropwise, with stirring, a total of 8.2 g. (0.056 mole) of ethylphosphonic dichloride over a period of 7 minutes at 28° to 52° C. The resulting mixture was cooled to room temperature and the triethylamine hydrochloride (13.6 g.) which had separated was removed by distillation. The filtrate was evaporated to dryness and the residue was distilled in vacuo to obtain 5.9 g. (63.5%) of 2-ethyl-1,3-dimethyl-1,3,2-diazaphosphorinane 2-oxide having a boiling point of 98° C./0.3 mm.

*Analysis.*—Calcd. for $C_7H_{17}N_2OP$ (percent): C, 47.71; H, 9.72; N, 15.98; P, 17.57. Found (percent): C, 47.60; H, 9.64; N, 15.83; P, 17.39.

The compounds of the invention having the Formula I as described above possess useful properties as catalysts in the synthesis of carbodiimides from the corresponding organic isocyanates. It has been suggested previously in the art than organophosphorus compounds can be used as catalysts in the conversion of organic isocyanates to the corresponding carbodiimides. It has not been suggested previously, however, that cyclic phosphorus compounds of the Formula I containing oxygen and/or nitrogen atoms in the ring can be used for this purpose. Further, it has been found that the use of the Compounds I as catalysts in the formation of carbodiimides shows unexpected and unobvious advantages which will be discussed in more detail below.

Accordingly, in a further aspect of the present invention, there is provided an improved process for the conversion of organic isocyanates to carbodiimides wherein the improvement consists in employing a compound of the Formula I as catalyst.

The conversion of an organic isocyanate to the corresponding carbodiimide involves reaction between two isocyanate groups with liberation of $CO_2$ and is illustrated by the following equation:

$$2R\text{---}NCO \rightarrow R\text{---}N\text{=}C\text{=}N\text{---}R + CO_2$$

wherein R represents an organic radical, preferably an aromatic, aliphatic or araliphatic hydrocarbon residue, the only limitation on substitution in said radical being that it be free of substituents which are reactive with the isocyanate group. Thus, the organic radical should be free of substituents containing active hydrogen i.e. which display activity according to the Zerewitinoff test (Berichte 40, 2023, 1907). Representative of organic isocyanates which can be employed are methyl, ethyl, isopropyl, butyl, hexyl, octyl, octadecyl, allyl, 2-pentenyl, cyclopentyl, cyclohexyl, 1-cyclopentenyl, 2-cycloheptenyl, benzyl, phenethyl, 3-phenylpropyl, benzhydryl, 2-naphthylmethyl, naphthyl, phenyl, p-tolyl, o-tolyl, 3-nitrophenyl, 4-methoxyphenyl, 4-allyloxyphenyl, 3,4-xylyl, 2-chlorophenyl decahydronaphthyl, trifluoromethyl, 2-chloroethyl, 3-nitropropyl isocyanates and the like. It is to be understood that a mixture of isocyanates can be employed, if desired, to form unsymmetrically substituted carbodiimides.

In addition to the monoisocyanates exemplified above, polyisocyanates can be employed to produce linear or crosslinked polycarbodiimides. A particularly useful embodiment of the process of the invention is the conversion of polyisocyanates, especially diisocyanates to oligomeric polycarbodiimides terminated at each end by an isocyanate group.

Representative of the polyisocyanates which can be used in the improved process of the invention are: tolylene-2,4-diisocyanate, methylenediphenylene - 4,4' - diisocyanate, methylenediphenylene-2,2'-diisocyanate, methylenediphenyl - 2,2'-diisocyanate, methylenediphenylene-2,4'-diisocyanate, hexamethylenediisocyanate, biphenylene-4,4'-diisocyanate, 3,3'-dimethoxybiphenylene-4,4'-diisocyanate, and the like diisocyanates such as those listed in the tables of Siefken, Ann. 562, 122–135, 1949.

In carrying out the improved process of the invention the desired organic isocyanate is treated with a catalytic amount of the compound of Formula I above. The amount of catalyst of Formula I employed is advantageously of the order of about 0.1 to about 1.0 part by weight per 100 parts by weight of isocyanate though higher proportions of catalyst can be employed, if desired. The admixture of catalyst and isocyanate is accomplished by conventional procedures. For example, if the two compounds are solid the mixing can be accomplished by micronisation, ballmilling and the like. Where one or both compounds are liquid or can be melted, simple solution of one component in the other can be accomplished readily.

Generally speaking it is necessary to heat the mixture of catalyst (I) and organic isocyanate to elevated temperatures, advantageously to a temperature within the range of about 100° C. to about 250° C. to effect formation of the desired carbodiimide. In certain cases, however, reaction will take place at lower temperatures and in some instances will take place without the application of external heat. The completion of reaction is generally marked by the cessation of evolution of carbon dioxide and, when followed spectrographically, by the disappearance of the band characteristic of the isocyanate group from the infra red spectrum. The desired carbodiimide can be purified by procedures well-known in the art such as recrystallisation in the case of solids and distillation in the case of liquids.

The use of the compounds of the formula I as catalysts in the formation of carbodiimides from isocyanates is characterised by the very high yields and rates of conversion of isocyanate to carbodiimide. In many instances the yields are quantitative or substantially so and, in the majority of cases, are greater than 80%. In addition, certain of the compounds of Formula I possess other advantages which makes their use as catalysts particularly attractive. For example, the compounds of Formula I wherein R' and R" are lower alkyl, i.e. alkyl from 1 to 8 carbon atoms, inclusive, and Y represents O or N-lower-alkyl, are compounds having a lower boiling point than the carbodiimides in the formation of which they are employed as catalysts.

Thus, such compounds of Formula I, which can be represented by the following formula:

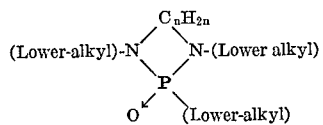

and

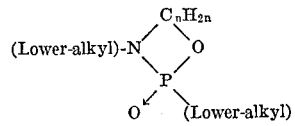

wherein $C_nH_{2n}$ is as hereinbefore defined, and preferably wherein $C_nH_{2n}$ represents ethylene or propylene, can be readily recovered from the reaction mixture by distillation, leaving the carbodiimide residue to be purified by conventional procedures such as recrystallisation. The catalyst so recovered can then be re-used in the conversion of further isocyanate to carbodiimide. The advantages of such catalysts are readily apparent and need no further explanation.

Another group of catalysts falling within the general Formula I which possess special advantages are those wherein R' represents aryl from 6 to 12 carbon atoms, inclusive, as hereinbefore defined and exemplified and R" represents alkyl from 1 to 18 carbon atoms or aryl from 6 to 12 carbon atoms inclusive i.e. the compounds having the formula:

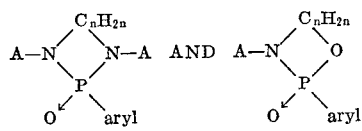

wherein $C_nH_{2n}$ is as hereinbefore defined, aryl represents aryl from 6 to 12 carbon atoms, inclusive, and A is selected from the class consisting of alkyl from 1 to 18 carbon atoms, inclusive and aryl from 6 to 12 carbon atoms, inclusive. The above compounds generally possess higher boiling points than the carbodiimides in whose production they are used. This enables the carbodiimide to be separated from the reaction mixture by distillation leaving a residue which contains the original catalyst and which can be re-used in the catalytic formation of carbodiimide from isocyanate. The application of such catalysts to the operation of semi-continuous processes is one of the obvious advantages which they possess.

In a modification of the improved process of converting the organic isocyanates to the corresponding carbodiimides especially adapted for the operation of continuous or semi-continuous processes, the product carbodiimide can be employed as the reaction medium. Thus, for example, a mixture of 50% by weight of starting isocyanate can be dissolved in the product carbodiimide in the presence of the catalyst. This enables a higher reaction temperature to be attained and thereby to increase the reaction date.

The carbodiimides produced according to the improved process of the invention can be used as is known in the art, to prevent ageing and hydrolysis of elastomers in accordance with procedures described, for example, by Newman et al. preprint of Fourth Rubber Technology Conference, London, May 22–25, 1962.

The carbodiimides produced according to the process of the invention are particularly useful in the stabilisation of polyurethanes. Generally, the carbodiimide is incorporated in the mix from which the polyurethane is prepared and becomes dispersed throughout the resulting polyurethane. A particularly interesting and novel class of carbodiimides which is described for the first time in this application is that of oligomeric low molecular weight isocyanate terminated carbodiimides which are produced by heating, at from about 100° C. to about 250° C., a diisocyanate having the formula:

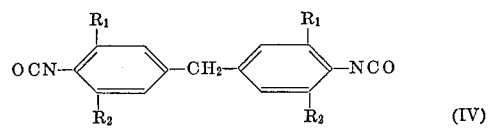

wherein $R_1$ represents lower-alkyl and $R_2$ is selected from the class consisting of lower-alkyl and hydrogen, and wherein the two $R_1$ groups are not necessarily identical and the two $R_2$ groups are not necessarily identical, with a catalytic amount (i.e. from about 0.1 to about 1.0 part by weight per 100 parts by weight of diisocyanate) of a compound of Formula I until such time as infrared spectral analysis (or other suitable analytical means) shows that approximately 50% of the original isocyanato groups in the starting material have been consumed. At this stage the reaction is terminated by cooling the reaction mixture, advantageously by addition of an inert organic solvent as hereinbefore defined and exemplified and/or by the application of external cooling. The solvent (if present) and catalyst are removed from the reaction mixture by distillation leaving a residue which comprises a mixture of difunctional (in regard to isocyanate) oligomeric low molecular weight isocyanate terminated carbodiimides of which the chief component has the following structure:

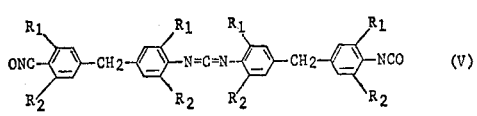

wherein $R_1$ and $R_2$ are as hereinbefore defined. The compounds of the above Formula V can be isolated from the mixture obtained as described above by conventional procedures, for example, by recrystallisation, chromatography, countercurrent distribution and the like.

The isocyanate terminated carbodiimides prepared as described above, either in the form of a crude mixture obtained by conversion of the starting diisocyanate (IV) or in the form of the purified dimer of the Formula V above, can be incorporated chemically into polyurethanes by virtue of the two isocyanate groups present therein. Thus, the isocyanate terminated carbodiimides can be used as part of the polyisocyanate component normally employed in the preparation of polyurethanes from polyisocyanates and polyols according to procedures known in the art; see Dombrow, supra. The polyurethanes thereby obtained have carbodiimide stabilising agents incorporated chemically into the polyurethane molecules and are thus distinguished from prior components wherein the carbodiimide stabilising agent is incorporated merely physically.

The diisocyanates (IV) which are employed as starting materials in the preparation of the isocyanate terminated carbodiimides as described above, are for the most part, known in the art. The tetraalkyl compounds (IV; $R_1=R_2=$alkyl) are prepared as described in British Pat. 852,651. The trialkyl and dialkyl compounds of Formula IV are prepared in similar manner by condensation of formaldehyde with the appropriate 2-alkylaniline or mixture of 2-alkylaniline and 2,6-dialkylaniline to give the corresponding 4,4'-diamino - 3,3'-dialkyldiphenylmethanes and 4,4' - diamino-3,3',5-trialkyldiphenylmethanes which are then phosgenated using procedures known in the art, see, for example Siefken supra, to yield the corresponding diisocyanates.

The following examples illustrate the use of the compounds of Formula I as catalysts in the conversion of organic isocyanates to the corresponding carbodiimides. It is to be understood that these examples are given for purposes of illustration and are not limiting and that any of the compounds (I) can be used as catalyst in the conversion to carbodiimides of any of the organic isocyanates defined and exemplified above using the procedures illustrated in the following examples.

EXAMPLE 26

To 133 g. (1 mole) of o-tolyl isocyanate was added 0.67 g. (0.5% by weight) of 2-phenyl-1,3-dimethyl-1,3,2-diazaphospholidine 2-oxide and the mixture was heated to reflux (184° C.); within 140 minutes the reaction temperature rose to 250° C. and an infrared spectrum, by the appearance of a strong band at 4.7µ (—N═C═N—) and disappearance of the isocyanate band at 4.4µ, indicated almost complete conversion. Vacuum distillation of the reaction mixture gave 100.3 g. (90%) of di-o-tolylcarbodiimide, boiling at 132 to 140° C./0.5 to 0.6 mm.

EXAMPLE 27

Illustration of reuse of the catalyst of Example 26 to the distillation residue from the reaction described in Example 26 was added 133 g. (1 mole) of o-tolyl isocyanate and the reaction mixture was heated to reflux temperature (184° C.); within 120 minutes the temperature rose to 250° C. Vacuum distillation of the reaction mixture gave 107.8 g. (97%) of di-o-tolylcarbodiimide, boiling at 134 to 146° C./0.3 mm.

EXAMPLE 28

To 26.6 g. (0.2 mole) of o-tolylisocyanate was added 0.125 g. (~0.5% by weight) of 2-ethyl-1,3-dimethyl-1,3,2-diazaphospholane 2-oxide. The reaction mixture was heated to reflux (184° C.) and within 20 minutes a temperature of 250° C. was obtained. Vacuum distillation of the reaction product gave a first fraction of 2.0 g. boiling at 38 to 122° C./0.2 mm. of a mixture of o-tolyl isocyanate, catalyst and some product, and a second fraction of 18.6 g. (84%) of pure di-o-tolylcarbodiimide, boiling at 122 to 135° C./0.2 to 0.4 mm.

EXAMPLE 29

*Illustration of reuse of catalyst*

To 26.6 g. (0.2 mole) of o-tolyl isocyanate was added the first fraction obtained in the distillation of the reaction product in Example 27. The resulting mixture was heated to reflux (180° C.) and within 26 minutes a temperature of 260° C. was obtained. Vacuum distillation of the product gave 21.6 g. (97%) of di-o-tolylcarbodiimide boiling at 128 to 138° C./0.2 to 0.3 mm.

EXAMPLE 30

To 26 g. (0.2 mole) of o-tolyl isocyanate was added 0.100 g. (~0.5% by weight) of 2-chloromethyl-1,3-dimethyl-1,3,2-diazaphospholane 2-oxide. The reaction mixture was heated to reflux (180° C.) and within 180 minutes a temperature of 250° C. was obtained. Vacuum distillation of the product gave 17.2 g. (77.5%) of di-o-tolylcarbodiimide boiling at 128 to 130° C./0.3 mm.

EXAMPLE 31

To 25 g. (0.21 mole) of phenyl isocyanate was added 0.125 g. of 2-ethyl-1,3-dimethyl-1,3,2-diazaphospholane 2-oxide and the mixture was heated for 10 minutes at 150 to 230° C. Vacuum distillation of the reaction product gave 16.6 g. (81.7%) of diphenylcarbodiimide. boiling at 118° C./0.7 mm.

EXAMPLE 32

To 25 g. (0.2 mole) of cyclohexyl isocyanate was added 0.125 g. of 2-ethyl-1,3-dimethyl-1,3,2-diazaphospholane 2-oxide and the mixture was heated for 13 hours at 169 to 251° C. Distillation of the product gave 15.9 g. (77.5%) of dicyclohexyl carbodiimide, boiling at 96 to 98° C./0.3 mm.

EXAMPLE 33

*Use of a carbodiimide as the reaction medium*

To a mixture of 12.5 g. (0.1 mole) of cyclohexyl isocyanate and 12.5 g. dicyclohexyl carbodiimide was added 0.200 g. of 2-ethyl-1,3-dimethyl-1,3,2-diazaphospholane 2-oxide and after heating for five hours at 180 to 270° C. the product was distilled in vacuum to give 19.6 g. (69% conversion) of dicyclohexyl carbodiimide, boiling at 98 to 100° C./0.3 mm.

EXAMPLE 34

To 25 g. (0.85 mole) of octadecyl isocyanate was added 0.125 g. of 2-ethyl-1,3-dimethyl-1,3,2-diazaphospholane 2-oxide and, after heating for 2 hours at 200 to 250° C., the isocyanate was found by infrared analysis to be completely converted to the carbodiimide. The residue was recrystallised from ligroin to give dioctadecyl carbodiimide, melting at 50 to 53° C.

EXAMPLE 35

*Di-(m-chlorophenyl) carbodiimide*

A mixture of 30.7 g. (0.2 mole) of m-chlorophenylisocyanate and 0.037 g. of 2-ethyl-1,3-dimethyl-1,3,2-diazaphospholane 2-oxide was heated for 35 minutes at 180 to 200° C. after which time the infra red specrtum showed the absence of the characteristic isocyanate band. The reaction product was distilled under reduced pressure. The first fraction (0.25 g.) contained unchanged catalyst. The second fraction (24.55 g.) having a boiling point of 174 to 176° C./1.4 mm. was di-(m-chlorophenyl) carbodiimide which solidified to crystals having a melting point of 43 to 46° C.

EXAMPLE 36

*Di-[2,6-diethyl-4-(3,5-diethyl-4-isocyanatobenzyl) phenyl] carbodiimide*

A mixture of 72.4 g. (0.2 mole) of 3,3',5,5'-tetraethyl-diphenyl-methane-4,4'-diisocyanate (British Pat. 852,651) and 0.724 g. of 2-ethyl-1,3-dimethyl-1,3,2-diazaphospholane 2-oxide was heated under nitrogen for 60 minutes at 230° C. at the end of which time the infrared spectral analysis of an aliquot showed the disappearance of 44% of the original isocyanate. The reaction mixture was quickly cooled to room temperature. There was thus obtained a mixture of difunctional (in terms of isocyanato groups) oligomeric low molecular weight isocyanate terminated carbodiimides containing principally di-[2,6-diethyl-4-(3,5-diethyl-4-isocyanatobenzyl) phenyl] carbodiimide. A sample of 10 g. of the above mixture was dissolved in 100 ml. of dry acetone and the resulting solution was allowed to stand at 0° C. for a short period. The solid which had separated was isolated by filtration. There was thus obtained 2.54 g. of di-[2,6-diethyl-4-(3,5-diethyl-4-isocyanatobenzyl) phenyl] carbodiimide in the form of a crystalline solid having a melting point of 88 to 90° C.

*Analysis.*—Calcd. for $C_{45}H_{44}N_4O_2$: N, 8.32%. Found: N, 8.67%.

The acetone mother liquors from the above crystallisation were treated with 100 ml. of a 1:1 mixture of methanol and carbon tetrachloride and the mixture was refluxed for 4 hours. The resulting solution was concentrated by evaporation and the solid which separated was isolated by filtration to yield 6.84 g. of a mixture of methylurethanes having a melting point of 107 to 118° C. and an infrared spectrum showing a sharp band at $4.65\mu$ corresponding to the N=C=N group.

Using the procedure described in Example 36, but replacing 3,3′,5,5′-tetraethyldiphenylmethane-4,4′-diisocyanate by 3,3′,5,5′-tetramethyl-3,3′,5,5′-tetrapropyl- and 3,3′,5,5′-tetrabutyldiphenylmethane-4,4′-diisocyanate (all prepared as described in B.P. 852,651) there are obtained the corresponding mixtures of difunctional oligomeric low molecular weight isocyanate terminated carbodiimides from each of which mixtures the principal component is isolated by crystallisation from acetone to yield di-[2,6-dimethyl - 4 - (3,5 - dimethyl-4-isocyanatobenzyl)phenyl] carbodiimide, di - [2,6-dipropyl-4-(3,5-dipropyl-4-isocyanatobenzyl) phenyl] carbodiimide and di-[2,6-dibutyl-4-(3,5 - dibutyl-4-isocyanato-benzyl)phenyl] carbodiimide, respectively.

EXAMPLE 37

*Di-[2-ethyl-4-(3-ethyl-4-isocyanatobenzyl)phenyl] carbodiimide*

A mixture of 61.2 g. (0.2 mole) of 3,3′-diethyldiphenylmethane-4,4′-diisocyanate and 0.306 g. of 2-ethyl-1,3-dimethyl-1,3,2-diazaphospholane 2-oxide was heated under nitrogen at 150° C. for 1.5 hours. At the end of this time infrared spectral analysis of a sample showed a decrease of 51% of the isocyanate absorption at $4.42\mu$ and the appearance of the characteristic N=C=N absorption band at $4.65\mu$. To the mixture so obtained was added 100 ml. of o-dichlorobenzene which was subsequently removed by distillation under reduced pressure with simultaneous removal of the phospholane oxide catalyst. There was thus obtained a mixture of difunctional oligomeric low molecular weight isocyanate terminated carbodiimides containing principally di-[2-ethyl-4-(3-ethyl-4-isocyanatobenzyl) phenyl] carbodiimide. The latter was purified by recrystallisation from acetone.

Similarly, using the procedure described in Example 37 above but replacing 3,3′-diethyldiphenylmethane-4,4′-diisocyanate by 3,3′-dimethyl and 3,3′ diisopropyldiphenylmethane-4,4′-diisocyanate, there are obtained di-[2 - methyl-4-(3-methyl-4-isocyanatobenzyl)phenyl] carbodiimide and 2-[2-isopropyl-4-(3-isopropyl-4-isocyanatobenzyl)phenyl] carbodiimide, respectively.

I claim:

1. A compound having the formula:

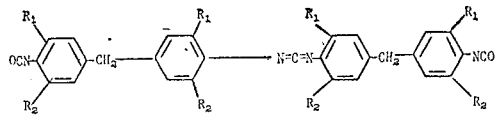

wherein $R_1$ represents lower-alkyl and $R_2$ is selected from the class consisting of lower-alkyl and hydrogen.

2. Di-[2,6-diethyl-4 - (3,5-diethyl-4-isocyanatobenzyl)- phenyl] carbodiimide.

3. Di-[2 - ethyl - 4 - (3 - ethyl - 4 - isocyanatobenzyl)- phenyl]carbodiimide.

4. In a process for the catalytic conversion of an organic isocyanate, having no active hydrogen containing substituents reactive with an isocyanate, to the corresponding carbodiimide, said organic isocyaante being selected from the class consisting of alkyl isocyanates from 1 to 18 carbon atoms, inclusive, alkenyl isocyanates from 3 to 5 carbon atoms, inclusive, cycloalkyl isocyanates from 5 to 6 carbon atoms, inclusive, cycloalkenyl isocyanates from 5 to 7 carbon atoms, inclusive, aralkyl isocyanates from 7 to 13 carbon atoms, inclusive, aryl isocyanates from 6 to 10 carbon atoms, inclusive, arylene diisocyanates from 6 to 12 carbon atoms, inclusive, methylenebis(phenyl isocyanates) which contain from 0 to 2 lower-alkyl groups in the phenyl nuclei, and hexamethylene diisocyanate, the improvement which comprises employing as catalyst in said conversion from about 0.1 to about 1.0 part by weight per 100 parts by weight of said organic isocyanate of a compound having the formula:

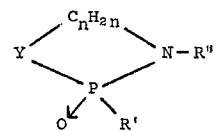

wherein $C_nH_{2n}$ represents alkylene containing from 1 to 12 carbon atoms, inclusive, at least one and not more than 3 adjacent carbon atoms in said alkylene radical forming a chain one end of which is attached to Y and the other end of which is attached to N thereby completing the heterocyclic ring; R′ is selected from the class consisting of hydrocarbyl containing from 1 to 18 carbon atoms, inclusive, and halo-, nitro-, alkoxy-, alkylmercapto-, and cyano-, substituted hydrocarbyl containing from 1 to 18 carbon atoms, inclusive; R″ is selected from the class consisting of hydrogen, hydrocarbyl from 1 to 18 carbon atoms, inclusive, and the radical —CONHR‴ wherein R‴ represents hydrocarbyl containing from 1 to 18 carbon atoms, inclusive; and Y is selected from the class consisting of —O— and —NR″— wherein R″ has the significance above defined.

5. In a process for the catalytic conversion of an organic isocyanate having no active hydrogen containing substituents reactive with an isocyanate, to the corresponding carbodiimide, said organic isocyanate being selected from the class consisting of alkyl isocyanates from 1 to 18 carbon atoms, inclusive, alkenyl isocyanates from 3 to 5 carbon atoms, inclusive, cycloalkyl isocyanates from 5 to 6 carbon atoms, inclusive, cycloalkanyl isocyanates from 5 to 7 carbon atoms, inclusive, aralkyl isocyanates from 7 to 13 carbon atoms, inclusive, aryl isocyanates from 6 to 10 carbon atoms, inclusive, arylene diisocyanates from 6 to 12 carbon atoms, inclusive, methylenebis(phenyl isocyanates) which contain from 0 to 2 lower-alkyl groups in the phenyl nuclei, and hexamethylene diisocyanate, the improvement which comprises employing as catalyst in said conversion from 0.1 to about 1.0 part by weight per 100 parts by weight of said organic isocyanate of a compound having the formula:

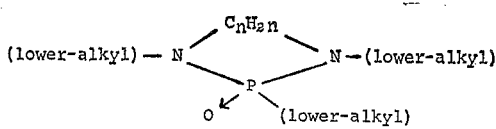

wherein $C_nH_{2n}$ represents alkylene containing from 1 to 12 carbon atoms, inclusive, at least one and not more than 3 adjacent carbon atoms in said alkylene radical forming a chain separating the N atoms in the heterocyclic ring and lower-alkyl represents alkyl from 1 to 18 carbon atoms, inclusive.

6. The process of claim 5 wherein the catalyst is 2-ethyl-1,3-dimethyl-1,3,2-diazaphospholane 2-oxide.

7. In a process for the catalytic conversion of an organic isocyanate having no active hydrogen containing substituents reactive with an isocyanate, to the corresponding carbodiimide, said organic isocyanate being selected from the class consisting of alkyl isocyanates from 1 to 18 carbon atoms, inclusive, alkenyl isocyanates from 3 to 5 carbon atoms, inclusive, cycloalkyl isocyanates from 5 to 6 carbon atoms, inclusive, cycloalkenyl isocyanates from 5 to 7 carbon atoms, inclusive, aralkyl isocyanates from 7 to 13 carbon atoms, inclusive, aryl isocyanates from 6 to 10 carbon atoms, inclusive, arylene diisocyanates from 6 to 12 carbon atoms, inclusive, methylenebis(phenyl isocyanates) which contain from 0 to 2 lower-alkyl groups in the phenyl nuclei, and hexamethylene diisocyanate, the improvement which comprises employing as catalyst in said conversion from about 0.1 to about 1.0 part by weight per 100 parts by weight of said organic isocyanate of a compound having the formula:

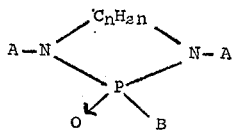

wherein $C_nH_{2n}$ represents alkylene containing from 1 to 12 carbon atoms, inclusive, at least one and not more than 3 adjacent carbon atoms in said alkylene radical forming a chain separating the N atoms in the heterocyclic ring; A is selected from the group consisting of alkyl containing from 1 to 8 carbon atoms, inclusive, and aryl from 6 to 12 carbon atoms, inclusive, and B is aryl containing from 6 to 12 carbon atoms, inclusive.

8. The process of claim 7 wherein the catalyst is 2-phenyl-1,3-dimethyl-1,3,2-diazaphospholane 2-oxide.

9. In a process for the catalytic conversion of an organic isocyanate having no active hydrogen containing substituents reactive with an isocyanate, to the corresponding carbodiimide, said organic isocyanate being selected from the class consisting of alkyl isocyanates from 1 to 18 carbon atoms, inclusive, alkenyl isocyanates from 3 to 5 carbon atoms, inclusive, cycloalkyl isocyanates from 5 to 6 carbon atoms, inclusive, cycloalkenyl isocyanates from 5 to 7 carbon atoms, inclusive, aralkyl isocyanates from 7 to 13 carbon atoms, inclusive, aryl isocyanates from 6 to 10 carbon atoms, inclusive, arylene diisocyanate from 6 to 12 carbon atoms, inclusive, methylenebis(phenyl isocyanates) which contain from 0 to 2 lower-alkyl groups in the phenyl nuclei, and hexamethylene diisocyanate, the improvement which comprises the step of reacting said organic isocyanate with from 0.1 to 1.0 part by weight per 100 parts by weight of isocyanate of a catalyst having the formula:

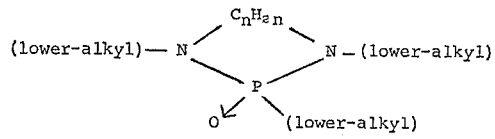

wherein $C_nH_{2n}$ represents alkylene containing from 1 to 12 carbon atoms, inclusive, at least one and not more than 3 adjacent carbon atoms in said alkylene radical forming a chain separating the N atoms in the heterocyclic ring, and lower-alkyl represents alkyl from 1 to 8 carbon atoms, inclusive, until the formation of carbodiimide is substantially complete and recovering the aforesaid catalyst from the reaction mixture by distillation.

10. The process of claim 9 wherein the catalyst is 2-ethyl-1,3-dimethyl-1,3,2-diazaphospholane 2-oxide.

References Cited

UNITED STATES PATENTS

| | | | |
|---|---|---|---|
| 2,840,589 | 6/1958 | Smelt | 260—453 |
| 3,056,835 | 10/1962 | Monagle et al. | 260—551 |
| 3,502,722 | 3/1970 | Newmann | 260—453 XR |

FOREIGN PATENTS

| | | |
|---|---|---|
| 1,145,353 | 9/1963 | Germany. |

CHARLES B. PARKER, Primary Examiner

D. H. TORRENCE, Assistant Examiner

U.S. Cl. X.R.

252—426; 260—2.5 AT, 2.5 AJ, 2.5 BB, 45.7 P, 77.5 AT, 453 P, 543 P, 551 P, 566 R